United States Patent [19]

Burns

[11] Patent Number: 5,070,720

[45] Date of Patent: Dec. 10, 1991

[54] LOOP FORMING TOOL FOR CABLES AND METHOD OF USE THEREOF

[76] Inventor: John W. Burns, 464 Highway 22 W., Ponchatoula, La. 70454

[21] Appl. No.: 644,527

[22] Filed: Jan. 23, 1991

[51] Int. Cl.⁵ .............................................. B21D 7/02
[52] U.S. Cl. ...................................... 72/457; 140/123
[58] Field of Search .......................... 72/457, 458, 217; 140/2, 123

[56] References Cited

U.S. PATENT DOCUMENTS

| | | | |
|---|---|---|---|
| 543,233 | 7/1895 | Forrester | 72/457 |
| 907,210 | 12/1908 | Williams | 72/457 |
| 1,211,020 | 1/1917 | Welsby | 140/123 |
| 2,730,157 | 1/1956 | Ponting | 72/217 |
| 2,804,887 | 9/1957 | Reck | 140/123 |
| 3,855,838 | 12/1974 | Jackson | 140/123 |
| 4,052,879 | 10/1977 | Crees | 72/457 |
| 4,964,290 | 10/1990 | Kimura | 72/217 |

*Primary Examiner*—David Jones
*Attorney, Agent, or Firm*—Richard C. Litman

[57] ABSTRACT

A tool for use in forming expansion loops in electrical communication cables or similar materials is formed of an elongated channel with opposing bends, thus forming a sinusoidal curve. The channel is twisted in order that the outer radius of each of the bends is contained within the walls of the channel. The tool is used by placing a length of electrical cable within one end of the channel and holding the electrical cable and any supporting line within the channel. The electrical cable is then grasped and held within the opposite end of the tool channel, and the tool is manipulated to form a sinusoidal curve in the electrical cable. The tool is then displaced along the electrical cable and simultaneously rotated 180 degrees, resulting in a mirror image of the first position. By again bending the electrical cable within the channel of the tool, a curve opposite the first curve is formed in the electrical wire, thus completing the formation of an expansion loop of consistent size and bend radius.

8 Claims, 1 Drawing Sheet

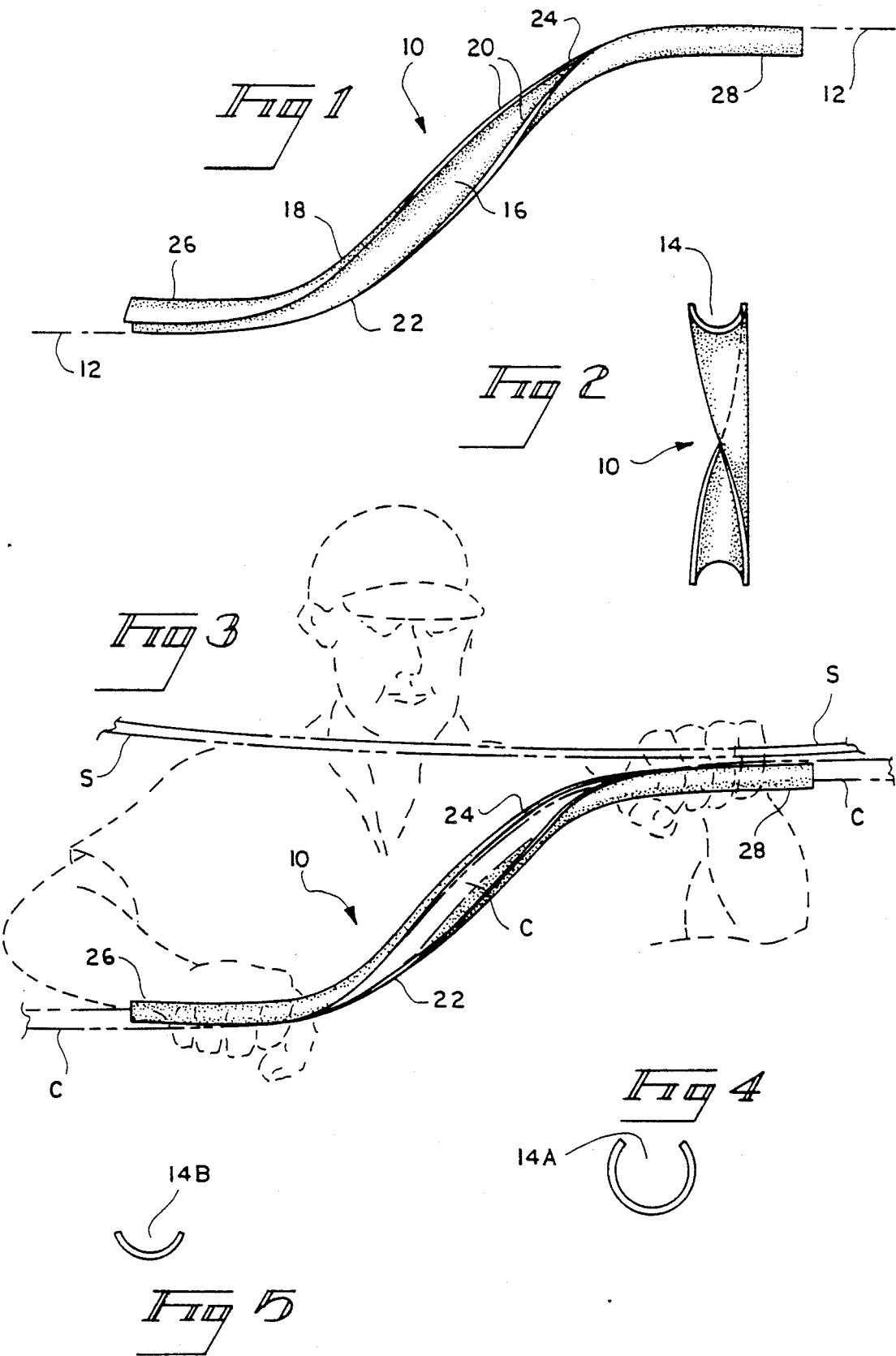

LOOP FORMING TOOL FOR CABLES AND METHOD OF USE THEREOF

FIELD OF THE INVENTION

This invention relates generally to devices for the forming of elongated extruded materials such as electrical cables wires, and the like, and more specifically to a tool formed of a single component for the forming of expansion loops in such materials.

BACKGROUND OF THE INVENTION

Electrical power and/or information is commonly transmitted by means of insulated cables or conductors, as is well known in that particular art. It is also a common practice to suspend such cables from poles or other relatively high supports. However, such power and other cables are generally not designed to handle the relatively high tensile loads on the cables which occur when these cables are suspended between supporting poles. Thus, the general practice is to string a stronger supporting wire or line between poles and in turn to support the power and other cables from the supporting line at more frequent intervals.

A problem which occurs with such a dual power cable and supporting line system is that the coefficients of thermal expansion of the cable and support line will almost certainly be different. In order to allow for such a difference it is standard procedure to allow some several inches of slack in the power or other cable at various points along the supporting line. Thus, should the supporting line expand at a greater rate than the supported cable, or should the supported cable contract to a greater degree than the supporting line, the intentional slack loop in the supported power or other cable will permit such differential expansion or contraction without causing the supported cable to be damaged.

In addition, there will be a tendency for rain or other moisture or condensation to collect on and travel along such a cable to its lowest point. If such a low point coincides with the passage of the cable into a structure, moisture will almost certainly eventually pass into the structure. Hence, common practice dictates that a "drip loop" of several inches of slack cable be formed in order to provide for a low point at the bottom of the drip loop before the cable passes into the structure.

Many of the power or other cables used for such purposes are of a sufficiently small size that any such slack loops desired may be readily formed by hand. In some situations, however, the assistance provided by some tool or other aid is desirable. In any case, even where hand forming is feasible, it is not possible to form consistently sized or shaped loops in cables without the use of a special forming tool. In fact, it has become increasingly common in the industry for cable manufacturers or installation companies to require the use of a special bending or forming tool in order to provide consistency and to prevent possible damage to the cable due to a bend of insufficiently large radius. However, the tools and devices presently in use for such purpose are generally relatively complex, being formed of an assembly of several components, and/or relatively complex, bulky or heavy.

The need arises for a tool for use in bending and forming cables and related materials, which tool is light, simple and compact. The tool should be capable of forming consistent bends in the appropriate materials and should also be easy to use with a minimum of training for the user. Furthermore, the tool should be of a durable nature, with a minimum of separate parts and also should be inexpensive to manufacture.

DESCRIPTION OF THE RELATED ART

U.S. Pat. No. 3,888,101 issued to S. R. Crees on June 10, 1975 discloses a cable bender comprising two hingedly attached components which may be pivoted relative to one another about the hinge axis by means of ratchet or other wrench handles. This device is relatively complex due to the number of individual components which are used in the apparatus. Moreover, the device of the above cited Crees patent appears to be intended for use with somewhat heavier cable than that to be formed by means of the present invention, as is implied by the mechanical advantage permitted by the apparatus.

U.S. Pat. No. 4,406,149 issued to D. E. Johnson on Sept. 27, 1983 discloses a device for use in bending and forming electrical wiring. While this device is of a relatively simple nature, being formed of a single piece (excluding the wrench used to operate it), the completely enclosed component used to capture the cable for bending precludes the use of the device in situations where the end of the cable is not accessible to pass the device over the cable end. The device of the above cited Johnson patent is primarily intended for use in confined spaces, such as electrical utility boxes and the like, and is capable of forming a bend in only a small section of cable at any single operation.

U.S. Pat. Nos. D-110,608 issued to L. O. Becker on July 26, 1938 and D-230,248 issued to L. D. Ely on Feb. 5, 1974 each disclose designs for devices to be used in the bending or forming of elongated materials. Each of these devices appears to be of a monolithic, single piece nature, but each appears to operate in a different manner than that of the present invention. As the designs shown in the above cited patents to Becker and Ely are disclosed only insofar as their appearance is concerned no functional utility is seen which might relate to the present invention.

None of the above noted patents, either singly or in combination, are seen to disclose the specific arrangement of concepts disclosed by the present invention.

SUMMARY OF THE INVENTION

By the present invention, an improved loop forming tool for cables and the like is disclosed.

Accordingly, one of the objects of the present invention is to provide an improved tool for the forming of expansion loops and/or drip loops in cables and like elements commonly used in the transmission of cable television signals, telephone service, and/or electrical power and the like.

Another of the objects of the present invention is to provide an improved tool for the forming of cable and the like, which serves as a die for the forming of a loop in such cable, wire or the like along a substantial length of the cable or wire in a single use.

An additional object of the present invention is to provide an improved tool for such cable or wire forming, which is of a monolithic nature and formed of a single piece of material.

A further object of the present invention is to provide an improved tool for such cable or wire forming which may be easily manufactured from readily available and inexpensive stock.

Yet another object of the present invention is to provide an improved tool for such cable or wire forming which, in accordance with the above objective, is of economical manufacture.

Still another object of the present invention is to provide an improved tool for such cable or wire forming which is simple to use and which may be operated with a minimum of training.

Another object of the present invention is to provide an improved tool for such cable or wire forming which is relatively compact and easily storable.

Yet another object of the present invention is to provide an improved tool for such cable or wire forming which may be manufactured of a variety of materials.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 1 is a side view of the cable forming tool showing its various features.

FIG. 2 is an end view of the tool shown in FIG. 1, showing the common plane in which the tool is formed.

FIG. 3 is an environmental view showing the tool in use.

FIG. 4 is a cross sectional view showing an alternate cross sectional shape of the tool of FIGS. 1 through 3.

FIG. 5 is a cross sectional view showing another alternate cross sectional shape of the tool of FIGS. 1 through 3.

Similar reference characters designate corresponding parts throughout the several figures of the drawings.

DESCRIPTION OF THE PREFERRED EMBODIMENT

Referring now to the drawings, particularly FIG. 1 of the drawings, the present invention will be seen to relate to an improved tool 10 for the bending and forming of cables wires and the like. Tool 10 may be generally formed from a length of metallic or other tubing, conduit or the like, by cutting such tubing generally in half along its major axis 12. Two portions, each of semicircular cross section 14 as shown in FIG. 2, will result. These resulting portions will have both a concave interior surface or channel 16 and a convex exterior surface 18.

The semicircular portions resulting each may then be formed to a shape generally corresponding to that shown in FIGS. 1, 2 and 3. This may be accomplished by forming a generally sinusoidal shape in each semicircular portion and also providing a twist of 180 degrees along the major axis 12. As the resulting tool 10 will be used to bend or form a cable C or similar material by placing the cable C within the channel 16 of tool 10, the upper edges or walls 20 of channel 16 serve to retain any cable C placed therebetween. Thus, the two opposing bends 22 and 24 formed in tool 10 which when combined serve to form the sinusoidal shape of tool 10, are formed in a convex curve along the major axis 12 of tool 10 when the curve is viewed from the side of tool 10 containing the interior surface 16. In other words, the outer radius of each of the two opposing bends 22 and 24 is contained within channel 16, while the inner radius of each of the bends 22 and 24 lies upon the convex exterior surface of tool 10. The resulting opposing bends will lie in a single plane as more clearly shown in FIG. 2.

Each opposing bend 22 and 24 nominally comprises an arc of 45 degrees, but may be bent to any suitable arc as may be desired for any specific application of the tool 10. Bends 22 and 24 are nominally of a radius of some six inches in order to prevent damage to a cable C due to too small a bend radius, but may be formed to a greater or smaller bend radius depending upon the specific cable C or other material to be formed with tool 10.

Tool 10 is preferably formed of a lightweight yet durable metallic material, such as aluminum, but may be molded, extruded, or otherwise formed of any suitable material such as steel or even a relatively hard plastic or any other material which may serve the purpose. In a like manner, the circular cross section 14 of tool 10 need not comprise an arc of 180 degrees, but may be formed to provide an arc of greater than 180 degrees (and thus a smaller opening for the insertion of a cable C) around semicircular cross section 14A as shown in FIG. 4, or alternatively may be formed to provide an arc of less than 180 degrees (thus providing a larger opening) around semicircular cross section 14B. as shown in FIG. 5.

Tool 10 may be used for the formation of expansion and/or drip loops in electrical communications cables or other similar cables or materials, as noted above. Generally, a suspension line S is installed along the desired cable route and an electrical communications or power cable C is suspended from suspension line S at various points as required. Slack areas or loops are formed in electrical cable C at various locations as necessary in order to provide for differential expansion and contraction between the two cables C and S, or to provide for a drip loop in cable C.

Tool 10 may be used to precisely form such loops to a uniform and consistent size and bend radius by placing tool 10 along cable C so that cable C generally rests along the center of channel 16. The user of tool 10 may then position a hand on each end 26 and 28 of tool 10, including cable C within his grasp at the lead end 26 of tool 10 and both cable C and support line S at the trailing end 28 of tool 10. By then moving the lead end 26 of tool 10 (and cable C contained therein) downward and away from supporting line S, cable C will be drawn over the opposing bends 22 and 24 of tool 10 while being retained within the upper walls of channel 16. This will result in a sinusoidal bend formed in cable C, which bend will be congruent with channel 16 of tool 10.

The resulting shape of cable C will appear as shown in FIG. 3, with the side of cable C corresponding to lead end 26 of tool 10 displaced some distance (according to the bend radius of opposing bends 22 and 24) below supporting line S. In order to complete the expansion or drip loop in cable C, tool 10 may then be moved along the length of cable C in the direction of the displaced portion of cable C (toward the lead end 26 of tool 10) a distance approximately equal to the length of tool 10, and simultaneously rotated 180 degrees about cable C in order to reverse the direction of curvature of the two opposing bends 22 and 24 relative to cable C. Simultaneously, the hand of the user which was grasping trailing end 28, cable C and line S, may release supporting line S in order to retain cable C within channel 16 of trailing end 28 as tool 10 is moved to the portion of cable C which has been displaced from supporting line S by the above action.

A second opposing sinusoidal curve may then be formed in cable C by moving lead end 26 of tool 10 (and thus the portion of cable C contained therein) into position adjacent supporting line S, while retaining trailing end 28 (and the portion of cable C contained therein) at the distance beneath supporting line S established by the first manipulation of tool 10. Cable C will be drawn over opposing bends 22 and 24 of tool 10, thus forming the opposing sinusoidal bends as in the first manipulation of tool 10, as the orientation of tool 10 along its major axis 12 will have been rotated by 180 degrees by the translation of tool 10 along and about cable C.

The resulting double and opposing sinusoidal curves in cable C will cause cable C to form a relatively wide and shallow "U" shape, with the center of the "U" depending below supporting line S. Cable C may then be secured to supporting line S at each end of the portion formed by tool 10, at the locations where cable C is adjacent to line S. Thus, an expansion or drip loop may be quickly and easily formed in a cable C by the manipulation of tool 10 and cable C as described above.

It is to be understood that the present invention is not limited to the sole embodiment described above, but encompasses any and all embodiments within the scope of the following claims.

I claim:

1. A tool for the forming of expansion loops and/or drip loops in television signal transmission and other cables, said tool comprising an elongated channel of generally semicircular cross section.
   said tool having a major axis and a leading and a trailing end,
   said tool containing opposing first and second bends between said leading and trailing ends,
   said first and second bends each having an inner and an outer radius, and
   said outer radii of said first and said second bends lying within said channel and said channel having a corresponding twist along said major axis.

2. A tool according to claim 1 wherein:
   said semicircular cross section includes 180 degrees.
3. A tool according to claim 1 wherein:
   said semicircular cross section is greater than 180 degrees.
4. A tool according to claim 1 wherein:
   said semicircular cross section is less than 180 degrees.
5. A tool according to claim 1 wherein:
   said tool is formed of aluminum.
6. A tool according to claim 1 wherein:
   said opposing bends each include an arc of 45 degrees.
7. A tool according to claim 1 wherein:
   said opposing bends lie within a single plane.
8. A method of forming expansion loops in television signal transmission and other cables, comprising the following steps:
   providing a tool having an elongated channel with opposing ends and opposing bends proximate said opposing ends
   placing said cable within said channel at one end of said tool,
   grasping said cable within said channel at the opposite end of said tool,
   manipulating said tool in order to cause said cable to conform to said opposing bends within said channel,
   translating said tool along said cable while simultaneously rotating said tool 180 degrees about the major axis of said tool,
   grasping said cable within said channel at each of said ends of said tool, and
   performing a second manipulation of said tool in an opposing direction to that of said first manipulation in order to cause said cable to conform to said opposing bends within said channel thereby forming an opposing bend in said cable to that formed by said first manipulation.

* * * * *